US008831132B2

(12) United States Patent
Ward

(10) Patent No.: US 8,831,132 B2
(45) Date of Patent: Sep. 9, 2014

(54) LOCATION SYSTEM

(75) Inventor: Andrew Martin Robert Ward, Great Shelford (GB)

(73) Assignee: Ubisense Limited, Chesterton (GB)

( * ) Notice: Subject to any disclaimer, the term of this patent is extended or adjusted under 35 U.S.C. 154(b) by 276 days.

(21) Appl. No.: 13/383,232

(22) PCT Filed: Jul. 2, 2010

(86) PCT No.: PCT/EP2010/059504
§ 371 (c)(1),
(2), (4) Date: Mar. 8, 2012

(87) PCT Pub. No.: WO2011/003840
PCT Pub. Date: Jan. 13, 2011

(65) Prior Publication Data
US 2012/0155569 A1    Jun. 21, 2012

(30) Foreign Application Priority Data

Jul. 10, 2009 (GB) .................................. 0912082.5

(51) Int. Cl.
| | |
|---|---|
| *H04L 27/00* | (2006.01) |
| *G01S 5/14* | (2006.01) |
| *G01S 13/02* | (2006.01) |
| *G01S 13/87* | (2006.01) |
| *G01S 7/00* | (2006.01) |
| *G01S 13/76* | (2006.01) |

(52) U.S. Cl.
CPC .................. *G01S 13/765* (2013.01); *G01S 5/14* (2013.01); *G01S 13/0209* (2013.01); *G01S 13/878* (2013.01); *G01S 7/003* (2013.01)
USPC ........... 375/295; 375/135; 375/150; 375/239; 375/259; 375/130; 375/221; 375/340; 375/345; 375/360

(58) Field of Classification Search
CPC .. H04B 1/71637; H04B 1/7163; H04B 1/079; H04B 3/00; H04B 14/026; H04L 25/4902; H04L 27/0004; H04L 63/0492
USPC ......... 375/295, 340, 342, 130, 135, 150, 221, 375/239, 345, 360; 327/291; 332/106; 341/20, 173
See application file for complete search history.

(56) References Cited

U.S. PATENT DOCUMENTS

| | | |
|---|---|---|
| 5,510,800 A | 4/1996 | McEwan |
| 6,812,824 B1 | 11/2004 | Goldinger et al. |

(Continued)

FOREIGN PATENT DOCUMENTS

JP     WO2008/013064     * 1/2008 .............. H04L 25/49

OTHER PUBLICATIONS

International Search Report and Written Opinion, issued in PCT/EP2010/059504, dated Sep. 10, 2010, 17 pages.

*Primary Examiner* — Dhaval Patel
(74) *Attorney, Agent, or Firm* — Rothwell, Figg, Ernst & Manbeck PC

(57) ABSTRACT

A receiver device for receiving a signal that comprises one or more periodic features, the receiver device comprising: a detector configured to listen to the signal during at least a first reception phase, and to be triggered when a feature of the signal is received so as to determine the time of reception of that feature; and a receiver configured to process time-limited segments of the signal so as to derive information from features of the signal received during those segments, the receiver being configured to be dependent on the detector such that after the first reception phase the timings of the time-limited segments processed by the receiver are dependent on the time of reception determined by the detector.

28 Claims, 4 Drawing Sheets

(56) References Cited

U.S. PATENT DOCUMENTS

| | | |
|---|---|---|
| 8,208,939 B2 * | 6/2012 | Aljadeff et al. ............ 455/456.1 |
| 2003/0058971 A1 | 3/2003 | Langford et al. |
| 2003/0090435 A1 | 5/2003 | Santhoff et al. |
| 2008/0012688 A1 * | 1/2008 | Ha et al. ...................... 340/10.1 |
| 2008/0151967 A1 | 6/2008 | Fullerton et al. |
| 2008/0238620 A1 | 10/2008 | Kuramoto |
| 2010/0020864 A1 * | 1/2010 | Matsuo et al. ................ 375/239 |
| 2010/0285731 A1 * | 11/2010 | Kim .............................. 454/239 |

* cited by examiner

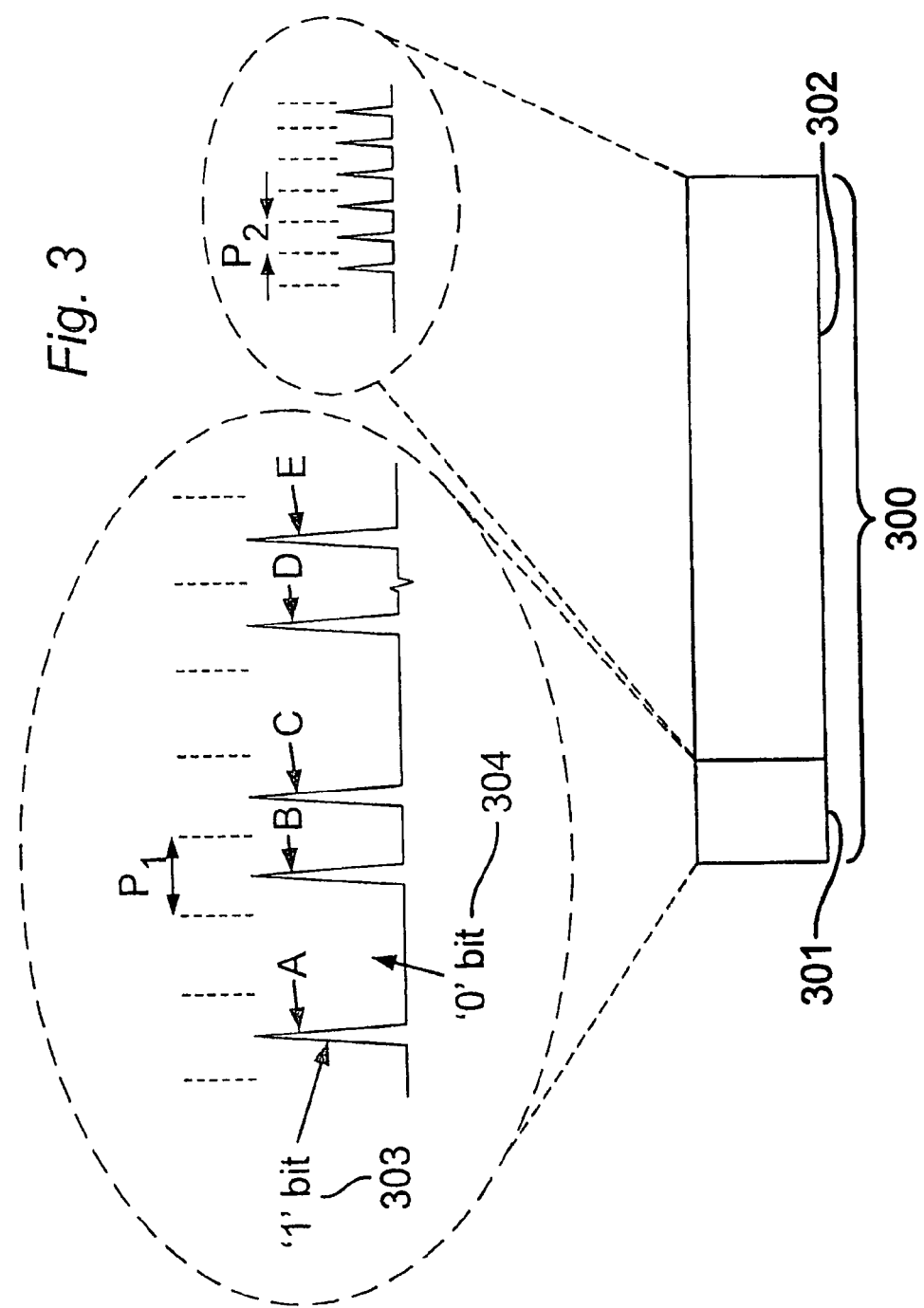

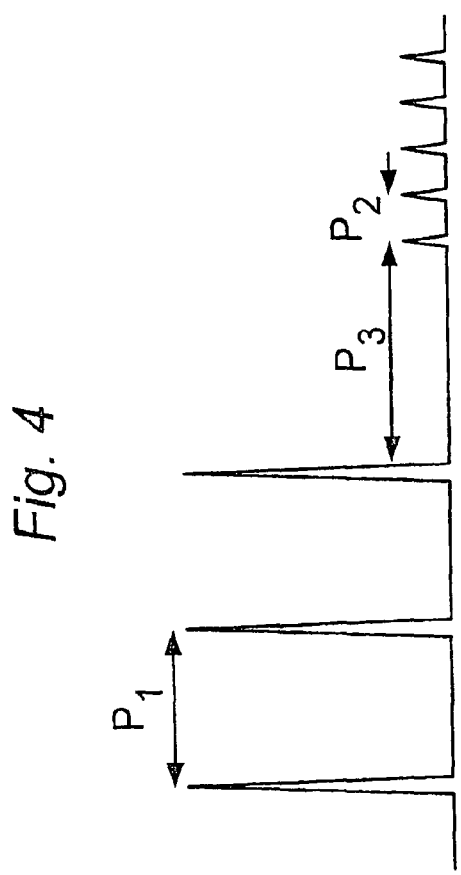

LOCATION SYSTEM

CROSS REFERENCE TO RELATED APPLICATION(S)

This application is a 35 U.S.C. §371 National Phase Entry Application from PCT/EP2010/059504, filed Jul. 2, 2010, designating the United States and also claims the benefit of Great Britain Application No. 0912082.5, filed Jul. 10, 2009, the disclosures of which are incorporated herein in their entirety by reference.

FIELD OF THE INVENTION

The invention relates to a receiver device for receiving a signal that comprises one or more periodic features, and a transmitter for transmitting such a signal. In particular, the invention relates to a location system in which a transmitter transmits such a signal by means of which it can be located by receivers of the location system.

BACKGROUND OF THE INVENTION

Ultrawideband (UWB) radio is a communications technology which uses short pulses of radiofrequency (RF) energy to transfer data and perform sensing functions. By using very short pulses, UWB signals have very high bandwidth compared to transmissions from traditional radio systems, and this confers advantages in both communicating data at very high speed and performing accurate sensing functions in cluttered environments.

One use of UWB radio technology is in location sensing applications. Typically, tags are attached to the objects to be located, and a network of sensors is placed at known points in the environment. UWB signals emitted by the tags are detected by the sensors, which use them to determine measurements such as the distance from the tag to the sensor. Processing logic can then combine the known sensor positions and the measurements to determine a 2D or 3D position for the tag. Typical UWB location systems are accurate to within a few tens of centimeters, even within environments that are normally challenging for radiolocation systems, for example those with many metal reflective surfaces.

A number of different receiver technologies have been used in sensors for UWB location systems. Generally, they fall into one of two different classes: non-coherent receivers and coherent receivers.

A non-coherent UWB receiver is designed to detect single, individual pulses within a UWB pulse train. Non-coherent receivers can be placed into a 'waiting' state, to be triggered only when a UWB pulse arrives at the receiver. At that moment, timing circuitry in the receiver records the time-of-arrival of the pulse.

One form of non-coherent UWB receiver uses a Schottky diode to rectify an incoming pulse signal which has been received via a UWB antenna, and amplified using a low-noise amplifier. The rectified signal is passed through a low-pass filter, and input to a high-speed comparator the latched output of which then triggers timing circuitry in the receiver to record the time-of-arrival of the pulse. The receiver is reset to detect a subsequent pulse by resetting the latch of the comparator.

A non-coherent UWB receiver can be used with an appropriate transmitter to transfer data from the transmitter to the receiver. For example, the transmitter may send a series of on-off keyed (OOK), or pulse-position-modulated (PPM) pulses, which are picked up by the receiver. Since the receiver timestamps the arrival of each pulse from the transmitter, it is able to determine whether a particular pulse from a train with a known period is missing (i.e. it is a '0' bit in an OOK modulation scheme, rather than a '1' bit which would be present), or has been transmitted at a slightly shifted time from that expected in the nominal pulse train (as might be expected if a PPM modulation scheme was used).

Non-coherent UWB receivers are limited in that a sophisticated signal processing analysis of the incoming signal is not typically possible because the signal is only received for a very short period.

A coherent UWB radio receiver is designed to detect a train of broadband radio pulses sent to it by a UWB transmitter. U.S. Pat. No. 5,510,800 describes such a coherent UWB radio receiver for use in position determination applications. In U.S. Pat. No. 5,510,800, the receiver is used to detect the presence or absence of an incoming train of UWB pulses, and measure the time-of-arrival of these pulses. It uses a sampling gate in the receiver, which mixes a replica of the expected incoming pulse with the incoming signal. The mixer has a high output response when it is triggered with a pulse replica at the exact moment when a pulse arrives at the receiver, and a low response if it is triggered when no pulse arrives at the receiver.

The incoming and replica pulses have a width of only a nanosecond or two (so as to generate the wide bandwidth desirable in the UWB system). Generally, the receiver does not initially know at what instant an incoming pulse may arrive at the receiver. It therefore shifts the time at which replica pulses drive the sampling gate across the full pulse repetition period of the pulse train, to ensure that the replica and incoming pulse trains coincide at the receiver at some point. A typical system might have a pulse repetition frequency of 10 MHz or less, so the pulse repetition period will be 100 ns or more. It can be seen, therefore, that the receiver searches for a narrow (~1 ns) signal in a wide (>~100 ns) window, and only detects that signal when the incoming and replica pulse trains are perfectly aligned. Consequently, the search may be quite time consuming.

Once the phase offset which results in alignment of the local replica pulse train and the incoming pulse train at a particular time has been determined, the receiver applies that offset to the local replica pulse train, so that the sampling gate is open when the next incoming pulse arrives at the receiver.

Since coherent receivers receive a train of coherent pulses, they are able to perform a more sophisticated analysis of the incoming signal than non-coherent receivers. However, coherent receivers take time to initially lock on to the transmitted signal. They also suffer from mismatches between the frequencies of the local clocks at the transmitter and receiver which generate the transmitted signal and replica signal respectively.

There is thus a need for an improved UWB receiver which is able to perform a more sophisticated analysis of the incoming signal without increasing the time taken to lock onto the signal, or suffering from mismatches between the clocking at either end of the communication channel.

SUMMARY OF THE INVENTION

According to a first aspect of the present invention, there is provided a receiver device for receiving a signal that comprises one or more periodic features, the receiver device comprising: a detector configured to listen to the signal during at least a first reception phase, and to be triggered when a feature of the signal is received so as to determine the time of reception of that feature; and a receiver configured to process time-limited segments of the signal so as to derive information from features of the signal received during those segments, the receiver being configured to be dependent on the detector such that after the first reception phase the timings of the time-limited segments processed by the receiver are dependent on the time of reception determined by the detector.

Preferably, the receiver is configured to process successive time-limited segments of the signal offset from each other by substantially the period of at least some of the features.

Preferably, the receiver is configured not to process portions of the signal between the said time-limited segments of the signal.

Suitably, the receiver comprises an integrator configured to integrate the signal received in successive ones of the said time-limited segments of the signal, the receiver being configured to process the output of the integrator.

Preferably, the receiver is a coherent signal receiver and the detector is a non-coherent signal receiver.

The receiver device suitably comprises a controller configured to cause the receiver to begin to process the said time-limited segments of the signal in response to the detector being triggered.

Suitably, the receiver comprises a decoder for decoding data in dependence on the detector detecting features of the signal, and wherein the controller is configured to cause the receiver to begin to process the said time-limited segments of the signal in response to the decoder decoding data that matches one or more predetermined data patterns and the detector being triggered.

Suitably, the controller is configured to signal to the receiver data indicating the determined time of reception of the feature.

Suitably, wherein each time-limited segment of the signal encompasses signal received at a time offset from the determined time of reception by an interval of duration (a+bc), where a and c are pre-determined constants and b is an integer. Preferably, b is not an integer multiple of a.

Suitably, the detector is configured to be triggered only by reception of a peak in the signal that exceeds a predetermined power threshold. Suitably, the receiver is capable of processing features of the signal whose maximum power is below the predetermined power threshold.

Suitably, the detector is configured to be triggered only by reception of a portion of the signal that lies in a predetermined frequency band.

Suitably, the detector is configured to continuously listen to the signal during the first reception phase.

Suitably, the receiver is suitable for receiving signals that comprise a portion comprising a series of pulses, each pulse being located in a respective time slot and each time slot being offset from the next by a time d; the receiver comprising multiple receivers configured to process time-limited segments of the signal so as to derive information from features of the signal received during those segments; and the receiver device being configured so as to, when one of the receivers is processing time-limited segments of the signal the timings of which are dependent on a first time of reception determined by the detector and the detector is triggered by a feature of the signal received at a second time of reception which is offset from the first time of reception by a value that is substantially offset from all integer multiples of the time d, cause a second one of the receivers to process time-limited segments of the signal, the timings of those time-limited segments being dependent on the second time of reception.

Preferably, the features are pulses.

Suitably, the receiver is inactive during the first reception phase.

Suitably, the receiver device is a part of a location system for estimating the location of a transmitter of the signal by means of the receiver.

Suitably, the receiver comprises a signal processor coupled to the or each receiver for receiving the output thereof so as to determine the time of reception of features received by the receiver(s).

According to a second aspect of the present invention, there is provided a transmitter for transmitting signals by means of which the transmitter can be located, the transmitter being configured to repeatedly transmit blocks of the following format: a first portion comprising a series of pulses, each pulse being located in a respective time slot and each time slot being offset from the next by a time d; and a second portion comprising a series of pulses, each pulse being located in a respective time slot and each time slot being offset from the next by a time e; the transmitter having an identity and the pulses of the first portion being arranged so as to convey the identity of the transmitter.

Suitably, the pulses of the first portion convey the identity of the transmitter by virtue of the omission of pulses from one or more of the time slots.

Suitably, the amplitude of the pulses of the first portion is greater than that of the pulses of the second portion.

Preferably, d is not an integer multiple of e.

Suitably, the first pulse of the second portion is offset from the last time-slot of the first portion by a period that is not an integer multiple of d.

Suitably, the first pulse of the second portion is offset from the last time-slot of the first portion by a period that is not an integer multiple of e.

Suitably, the length of each time-slot of the first portion is equal to the length of each of the pulses comprised in the first portion.

Suitably, the length of each time-slot of the second portion is equal to the length of each of the pulses comprised in the second portion.

BRIEF DESCRIPTION OF THE DRAWINGS

The present invention will now be described by way of example with reference to the accompanying drawings. In the drawings:

FIG. 3 illustrates a diagram of a UWB signal block according to the present invention; and FIG. 4 illustrates a diagram of UWB pulses according to the present invention.

DESCRIPTION OF THE PREFERRED EMBODIMENTS

Figure 1:
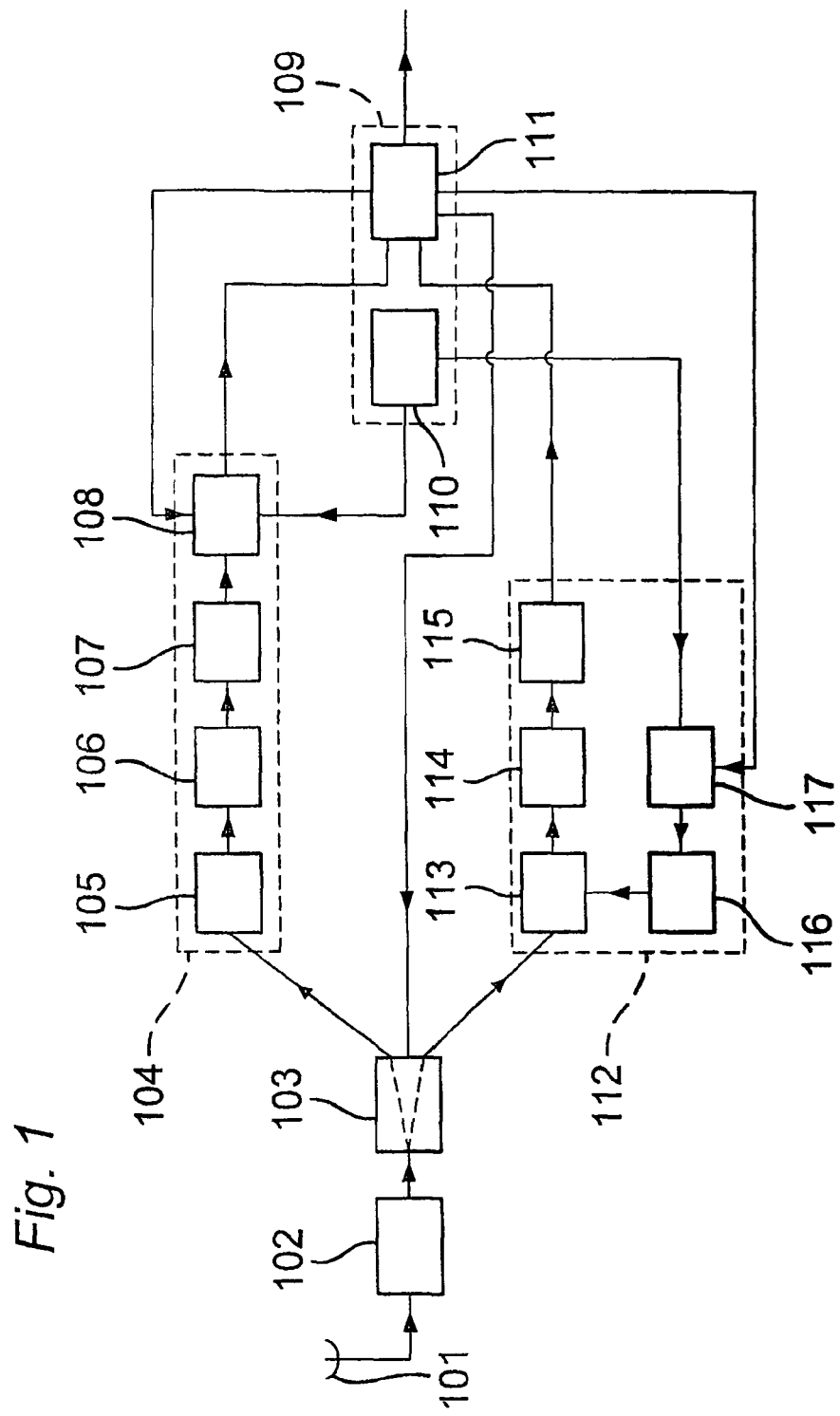
FIG. 1 illustrates a schematic diagram of a receiver apparatus according to the present invention.

FIG. 1 shows a schematic diagram of the general arrangement of a receiver apparatus according to one embodiment of the present invention.

The receiver apparatus comprises two receiver channels: a non-coherent channel 104 and a coherent channel 112. Both channels are fed from a radio-frequency (RF) front end comprising an antenna 101 whose output is amplified and filtered by a radio-frequency signal conditioning module 102. The output of the radio-frequency signal conditioning module 102 is passed to an RF switch 103. The switch 103 directs the incoming signal to either the non-coherent receiver channel 104 or the coherent receiver channel 112. A control signal from digital signal processor 111 (DSP) to the switch controls the switch to select one of the two channels.

The non-coherent channel 104 comprises a further signal conditioning block 105, the output of which is input to a diode detector 106. The output of the diode detector 106 is input to a comparator and latch 107. The output of the comparator and latch 107 is input to a field-programmable gate array 108 (FPGA). The FPGA also receives a clock signal input from the receiver clock 110 and control signals from the DSP 111. The FPGA outputs a signal to the DSP.

The coherent channel 112 comprises a mixer 113 which mixes the incoming UWB signal with a replica UWB signal generated by replica UWB pulse generator 116. The replica UWB pulse generator 116 is triggered by programmable trigger 117. The programmable trigger 117 receives a clock signal input from the receiver clock 110 and control signals from the DSP 111. The mixer 113 outputs the mixed signal to an integrator and signal conditioning module 114. The signal is then converted to a digital signal by analogue-to-digital converter 115, and output to the DSP 111.

The DSP analyses the signals it receives from the non-coherent receiver and coherent receiver and outputs them for further processing. The receiver clock signal is generated by a temperature-compensated crystal oscillator (TCXO) 110.

The operation of the receiver apparatus of FIG. 1 will now be described with reference to a UWB signal suitable for reception by the receiver apparatus. FIG. 3 illustrates a typical block of such a UWB signal. The block comprises two portions.

The first portion 301 comprises a series of pulses (marked A, B, C, D and E). Each pulse is located in a respective time slot. The time slots are offset from each other by a time $P_1$. Preferably, the first portion 301 conveys data. For example, the first portion 301 may comprise data indicating the identity of the transmitter. FIG. 3 illustrates a suitable modulation scheme for encoding the data. This modulation scheme is on-off keying (OOK). In OOK, the transmitter gates the transmission of its output pulse train based on whether the data bits to be sent are '0' or '1'. The rate at which bits are superimposed via OOK on the transmitted pulse train is known to both the transmitter and receiver(s) of the location system. In other words, the on-off gate period ($P_1$ in FIG. 3) for the transmitted pulse train is fixed within the system. Since the time (after the start of the signal transmission) at which each bit of data is transmitted is known to both the transmitter and receiver, the receiver can detect whether the bit is a '1' (because the pulse is present in the train, for example 303 in FIG. 3), or the bit is a '0' (because the pulse is absent in the train, for example 304 in FIG. 3).

The second portion 302 of the signal is preferably a continuous pulse train. It comprises a series of pulses, each pulse being located in a respective time-slot and each time-slot being offset from the next by a time $P_2$. Preferably, $P_2$ is smaller than $P_1$, and $P_1$ is not an integer multiple of $P_2$. The first pulse in the pulse train 302 is offset from the last time-slot in portion 301 by a known time. This time is illustrated in FIG. 4 as $P_3$. $P_3$ is known to the transmitter and the receiver. Preferably, $P_3$ is not an integer multiple of $P_1$ and $P_1$ is not an integer multiple of $P_3$. Preferably, $P_3$ is not an integer multiple of $P_2$, and $P_2$ is not an integer multiple of $P_3$. The advantage of $P_1$, $P_2$ and $P_3$ not being integer multiples of each other is that it reduces the likelihood that both a pulse of the first portion and a pulse of the second portion is expected at the same time, and consequently that one is mistaken for the other. The pulse train 302 may not consist of a continuous stream of periodic pulses. For example, pulses may be omitted from the pulse train periodically or randomly or pseudo-randomly. Such gapping may be implemented so as to reduce the transmitter power.

The duration of the first and second portions of the signal block is dependent on the particular application being implemented. A suitable length for the first portion is 100 μs. A suitable length for the second portion is 1 ms.

Initially during a time when the receiver apparatus is waiting to receive a signal, the DSP 111 activates the non-coherent receiver channel. Preferably, the non-coherent channel is configured to continuously listen to the signal during this time. Optionally, however, the non-coherent channel may intermittently or periodically listen to the signal. Such non-continuous listening may be implemented, for example, in a power-saving mode. The coherent receiver channel may be deactivated by the DSP 111 during this time. The UWB signal is received by the antenna 101, amplified and filtered by signal conditioning module 102, and passed from the switch 103 to the non-coherent receiver channel 104 under the control of DSP 111. The UWB signal is then further amplified and filtered by signal conditioning module 105, and passed to the diode detector 106. The diode detector 106 rectifies the incoming signal, and passes it to the comparator and latch 107. The non-coherent receive channel acts as a detector for a UWB signal having a sufficiently high signal level. That UWB signal is detected by the incoming signal level rising above a pre-set threshold of the comparator. In response to this, the comparator triggers and sets the latch. The output signal of the latch is passed to the field-programmable gate array (FPGA) 108. The FPGA records the time-of-arrival of the signal relative to the base clock input signal it receives from the receiver clock 110. The FPGA 108 then resets the latch of the comparator 107, and passes the signal time-of-arrival information to the DSP 111. The non-coherent channel then continues to receive the data payload portion of the UWB signal if there is one, and pass this information onto the DSP 111. The DSP 111 then decodes the incoming pulses according to the modulation scheme employed.

In response to the non-coherent channel detecting that a UWB signal has been received and passing the time-of-arrival information onto the DSP 111, the DSP controls the coherent receive channel to activate. Since the times $P_1$, $P_2$ and $P_3$ are known to the DSP, and it has received the time-of-arrival information of at least one pulse in the first portion 301, it is able to calculate the time at which the first pulse in the pulse train 302 will be received by the receiving apparatus. It conveys this information to the coherent receiver channel 112, in order to set the coherent receiver channel's sampling window to coincide with the first pulse of the pulse train 302.

After the data payload portion (if present) has been received by the non-coherent channel, the DSP 111 controls the switch 103 to connect the incoming signal to the coherent channel 112. The DSP 111 may deactivate the FGPA 108 on activation of the coherent channel. The UWB pulses are then passed to the coherent receiver channel, for deeper analysis of the properties of the incoming pulses.

The pulses are passed into the RF port of mixer 113. The Local Oscillator (LO) port of the mixer is fed from replica UWB pulse generator 116, whose output duplicates that of the UWB transmitter. The output of the mixer is an Audio Frequency (AF) baseband signal. This is input to the integrator and signal conditioning module 114. By adding the integrating circuit to the output of the mixer, and triggering the mixer with a train of replica pulses with the same pulse repetition frequency as the expected incoming signal, it is possible to integrate multiple pulses (those which arrive at the receiver over a period determined by the time constant of the integrator) and pass the integrated signal out for subsequent signal detection and analysis by the DSP (for example presence/absence, phase shift, polarity). The advantage of this is that the radio energy contained in multiple pulses can be combined which has the effect of increasing the range at which a signal may be detected. The output of the integrator and signal conditioning module 114 is converted to digital in the ADC 115. The sampled ADC data is then passed to the DSP for processing.

The replica UWB pulse generator 116 is triggered by programmable trigger source 117 which generates, for example, a 1 MHz clock signal. The programmable trigger source 117 may be a ramp generator/comparator combination, direct digital synthesiser, or other mechanism which permits the phase of its output signal to be varied arbitrarily, and is supplied with a high accuracy base clock from a temperature compensated crystal oscillator 110. The programmable trigger source 117 is controlled by signals from the DSP 111 to adjust the phase of the trigger source output signal. The DSP 111 adjusts the output of the programmable trigger source 117 such that the active period of the mixer 113, which represents the receiver's sampling window, matches the calculated time-of-arrival of the first pulse of the pulse train 302. Since the period between the pulses in the pulse train, $P_2$, is known, the DSP is able to calculate the times-of-arrival of each of the following pulses and control the receiver window accordingly.

The DSP 111 adjusts the receiver's sampling window around the times-of-arrival of the pulses that it has calculated in order to determine various properties of the incoming pulses. For example, the angle-of-arrival of the UWB signal is detected by the phase of the replica pulse train being swept from 0° to 360° such that the replica pulse, at some point, drives the sampling gate at the same moment as the incoming UWB pulse reaches the receiver.

The time required to perform this sweep will depend on a number of parameters. One of these parameters is the pulse repetition frequency (PRF) of the UWB transmitter. A lower PRF implies a longer interval between pulses, which if the time window over which the sampling gate responds is fixed, implies a longer sweep time. Another parameter is the integration time of the coherent UWB receiver. A longer integration time demands that the replica pulse train must dwell at a particular phase for a longer time, thereby increasing the length of the sweep time.

The DSP modifies the receiver's sampling window in order to account for the drift between the transmitter clock and the receiver clock. The UWB transmitter and UWB receiver have different clocks driving the transmitted pulse train and the replica pulse train respectively. These clocks do not operate at exactly the same frequency. Therefore, after some time (determined by the degree to which the two frequencies are the same), the replica pulse train (offset by the amount determined by the receiver) and the transmitted pulse train will no longer coincide at the receiver. For continuous reception of the pulse train, it is therefore necessary to determine the degree of clock error between the transmitter and receiver, and (either continuously or periodically) adjust the phase offset of the local replica pulse train.

This may be achieved, for example, by performing the phase sweep twice in succession. Using the (known) time between the sweeps, and the phase offsets determined using each sweep, the DSP determines the clock error between transmitter and receiver. For example, if the transmitter and receiver clock frequencies were identical, there would be no difference in the phase offset determined by the two sweeps.

If the transmitter clock is faster than the receiver clock by a time $\tau$, then the DSP controls the programmable trigger source 117 to adjust the phase offset of the replica pulse train so that it is generated a time $\tau$ earlier than previously calculated for each pulse. Conversely, if the transmitter clock was slower than the receiver clock by a time $\tau$, then the phase offset of the replica pulse train would be adjusted to generate those pulses a time $\tau$ later than previously calculated for each pulse.

Since the pulses in the pulse train 302 are substantially identical, the DSP is able to examine the characteristics of a number of pulses as if they were the same pulse. In other words, detailed measurements (such as the phase of an incoming pulse) can be achieved by making repeated measurements on different pulses in the pulse train, and combining these measurements to form an overall picture of a single pulse. This allows for a very accurate determination of, for example, the angle of arrival of the UWB signal. The DSP 111 also preferably determines the precise time-of-arrival of the pulses.

The DSP passes the data along with the data bits decoded by the non-coherent receiver channel to other systems for further processing.

Figure 2:
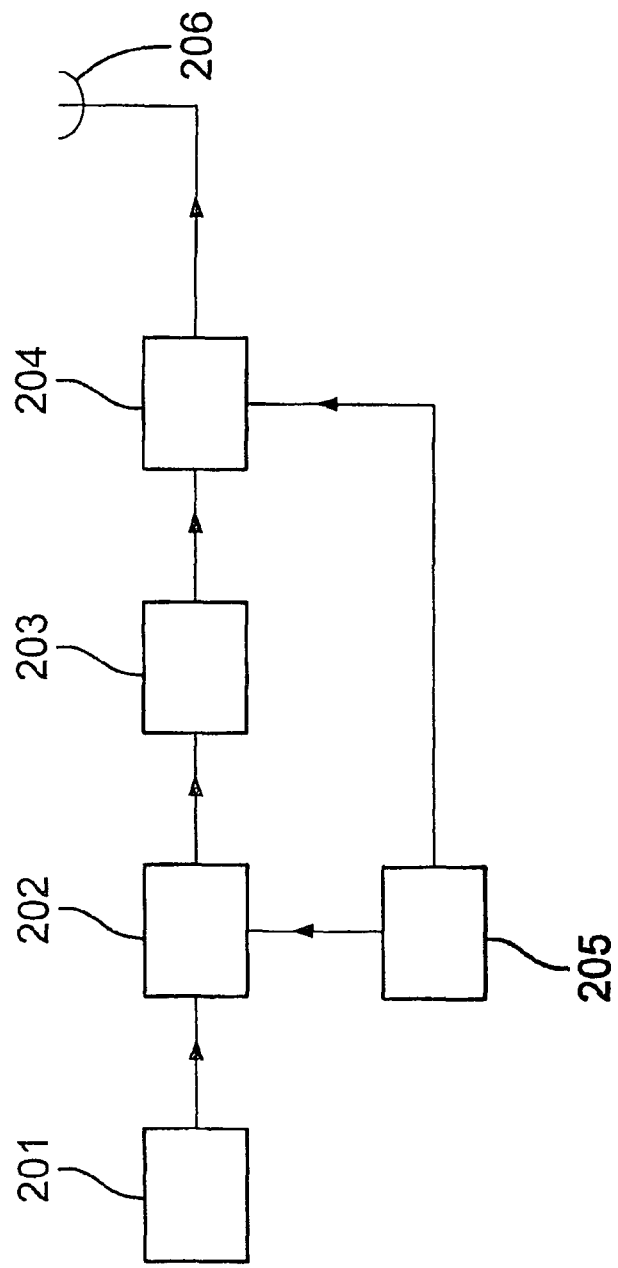
FIG. 2 illustrates a schematic diagram of a transmitter apparatus according to the present invention.

FIG. 2 shows a schematic diagram of the general arrangement of a transmitter according to one embodiment of the present invention.

The transmitter comprises a 1 MHz pulse train generator 201, the output of which is gated by an AND gate 202 and a gating signal controlled by a microprocessor 205. The pulse train generator is used to trigger a UWB pulse generator 203. The gating signal consists of a set of HIGH/LOW levels, representing a series of 1/0 bits, which comprise a data message assembled by the microprocessor 205. The length of the data message (i.e. the number of bits transmitted by the system) is application-dependent, but could (for example) generate a transmitted UWB signal of the form of the first portion 301 of the UWB signal block shown in FIG. 3. Once the data bits have been sent, the gating signal consists of a continuous HIGH signal for an extended period, in order to generate a continuous pulse train as shown in the second portion 302 of the UWB signal block shown in FIG. 3. Again, the length of the second portion is application-dependent.

The output of the UWB pulse generator is filtered by a signal conditioning block 204 to meet regulatory requirements, and then transmitted by UWB antenna 206. The signal conditioning block 204 may optionally include a variable gain amplifier or variable attenuator, controlled by the microprocessor 205, which can be used to change the relative pulse output power in the different portions of the transmitted signal.

A suitable implementation of the described system of the transmitter and receiver is a location system for determining the location of the transmitter. In such an implementation, the transmitter repeatedly transmits UWB signal blocks of the format described in relation to FIGS. 3 and 4. Suitably, the first portion of the block 301 comprises one or more of the following data: a known preamble, the identity of the transmitter, battery voltage data, and cyclic redundancy check (CRC) bits. Suitably, this data is transmitted using the OOK scheme previously described.

The non-coherent channel of the receiving apparatus receives the transmitted signal. The power level of the UWB pulse in the first portion of the block 301 exceeds the predetermined power threshold of the comparator 107 and hence triggers the latch, causing the time-of-arrival of that pulse to be recorded and communicated to the DSP 111. The DSP decodes the preamble. If this preamble matches one or more predetermined data patterns, then the DSP 111 controls the coherent receiver channel to process the second portion of the UWB signal block. The DSP indicates the calculated time-of-arrival of the first pulse of the second portion of the UWB signal to the coherent receiver. The non-coherent receiver continues to receive the remaining payload data and pass it to the DSP for decoding.

The coherent receiver channel then locks on to the pulse train of the second portion of the UWB signal without having to search for the pulse in the time domain since this information is provided by the DSP. The DSP is able to determine accurate measurements from the coherent receiver channel such as the time-of-arrival and angle-of-arrival of the pulses, which it is able to use to locate the position of the transmitter.

As an alternative to the receiving apparatus arrangement illustrated in FIG. 1, the receiving apparatus may not share a common RF front-end. In such an implementation, both the non-coherent and coherent receiver channels have separate antennas and signal conditioning modules. This allows the non-coherent receiver to continue to search for other UWB signals whilst the coherent receiver receives the pulse train of a UWB signal. Since the antennas are relatively close to each other (for example separated by 5 cm), the pulse time-of-arrival at the non-coherent receiver still gives a good indication of the time-of-arrival of the same pulse at the coherent receiver, and therefore the non-coherent receiver information would cut down the search that the coherent receiver would be required to cover to acquire the incoming pulse train.

In one implementation, the receiving apparatus is capable of receiving multiple UWB signals at the same time. In this implementation, there may be one non-coherent channel and multiple coherent channels, all connected to the DSP and receiver clock. For example, the coherent channels may be connected to different elements of a UWB antenna array such that precise angle-of-arrival information of the incoming UWB signals can be determined. After detecting a first UWB signal at the non-coherent channel, a first one of the coherent receive channels is activated to process the pulse train for that UWB signal. Meanwhile, the non-coherent receive channel is gated such that it ignores the pulse train for that first UWB signal, allowing it to search for other incoming UWB signals from other transmitters. On detection of another UWB signal at the non-coherent channel, a second one of the coherent receive channels is activated to process the pulse train for that UWB signal. The DSP operates as explained above in respect of each of the separate coherent channels.

Suitably, the amplitude of the pulses in the first portion of the UWB signal block 301 is greater than the amplitude of the pulses in the second portion of the UWB signal block 302. The pre-set threshold of the comparator is set such that it is lower than the amplitude of the pulses in the first portion of the UWB signal, but higher than the amplitude of the pulses in the second portion of the UWB signal. This decreases the chance that the comparator will trigger the latch in response to the reception of pulses in the second portion of the UWB block. The coherent receiver channel is able to process the second portion of the signal which has a maximum power level below the pre-set threshold.

However, there are a number of governmental regulations regarding UWB communications. One of these is a low-power requirement. Since the amplitude of the pulses in the first portion of the UWB signal block is higher than the amplitude of the pulses in the second portion of the UWB signal block, to fall within the low-power requirements the frequency of the pulses in the first portion is suitably lower than the frequency of the pulses in the second portion. In other words, suitably $P_2 > P_1$. The non-coherent receive channel is correspondingly configured to be triggered only by reception of a portion of the UWB signal that lies in a predetermined frequency band. This also reduces the likelihood of the non-coherent channel mistaking the pulse train of the second portion 302 of a UWB signal for the first portion 301 of a UWB signal.

An advantage of the location system described herein is that the receiving apparatus does not have to perform an extensive search in the time domain for the UWB pulse train. Instead, it is able to immediately lock on to the pulse train as a result of the non-coherent receive channel that detects when the first sufficiently high-powered pulse of the UWB signal is received. The receiving apparatus described herein is also able to perform sophisticated analysis on the received UWB pulses via the measurements performed by the coherent channel. However, the delay in acquiring the accurate measurements of the signal pulses is significantly reduced compared to a coherent receiver apparatus. Additionally, the number of pulses that need to be transmitted by the transmitter in order that it can be located by the receiver is reduced compared to a coherent receiver apparatus. Consequently, this reduces the power consumption of the transmitter and hence conserves its battery life.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A receiver device for receiving a signal that comprises one or more periodic features, the receiver device comprising:
   a detector configured to listen to the signal during a first reception phase, and to be triggered when a feature of the signal is received so as to determine a time of reception of that feature;
   a first antenna configured to provide the signal to the detector;
   a coherent receiver configured to process the signal in time-limited segments so as to derive information from features of the signal received during those segments, the coherent receiver being configured to be dependent on the detector such that after the first reception phase the timings of the time-limited segments processed by the coherent receiver are dependent on the time of reception determined by the detector; and
   a second antenna configured to provide the signal to the coherent receiver.

2. A receiver device as claimed in claim 1, wherein the coherent receiver is configured to process successive time-limited segments of the signal offset from each other by substantially the period of at least some of the features.

3. A receiver device as claimed in claim 2, wherein the coherent receiver is configured not to process portions of the signal between the said time-limited segments of the signal.

4. A receiver device as claimed in claim 3, wherein the coherent receiver comprises an integrator configured to integrate the signal received in successive ones of the said time-limited segments of the signal, the receiver being configured to process the output of the integrator.

5. A receiver device as claimed in claim 1, wherein the detector is a non-coherent signal receiver.

6. A receiver device as claimed in claim 1, wherein the receiver device comprises a controller configured to cause the coherent receiver to begin to process the said time-limited segments of the signal in response to the detector being triggered.

7. A receiver device as claimed in claim 1, comprising a decoder for decoding data in dependence on the detector detecting features of the signal, and wherein the controller is configured to cause the coherent receiver to begin to process the said time-limited segments of the signal in response to the decoder decoding data that matches one or more predetermined data patterns and the detector being triggered.

8. A receiver as claimed in claim 6, wherein the controller is configured to signal to the receiver data indicating the determined time of reception of the feature.

9. A receiver as claimed in claim 1, wherein each time-limited segment of the signal encompasses signal received at a time offset from the determined time of reception by an interval of duration (a+bc), where a and c are pre-determined constants and b is an integer.

10. A receiver as claimed in claim 9, wherein b is not an integer multiple of a.

11. A receiver device as claimed in claim 1, wherein the detector is configured to be triggered only by reception of a peak in the signal that exceeds a predetermined power threshold.

12. A receiver device as claimed in claim 11, wherein the coherent receiver is capable of processing features of the signal whose maximum power is below the predetermined power threshold.

13. A receiver device as claimed in claim 1, wherein the detector is configured to be triggered only by reception of a portion of the signal that lies in a predetermined frequency band.

14. A receiver device as claimed in claim 1, wherein the detector is configured to continuously listen to the signal during the first reception phase.

15. A receiver device as claimed in claim 1, the coherent receiver being suitable for receiving signals that comprise a portion comprising a series of pulses, each pulse being located in a respective time slot and each time slot being offset from the next by a first time; the coherent receiver comprising multiple receivers configured to process time-limited segments of the signal so as to derive information from features of the signal received during those segments; and the receiver device being configured so as to, when one of said receivers is processing time-limited segments of the signal the timings of which are dependent on a first time of reception determined by the detector and the detector is triggered by a feature of the signal received at a second time of reception which is offset from the first time of reception by a value that is substantially offset from all integer multiples of the first time, cause a second one of the receivers to process time-limited segments of the signal, the timings of those time-limited segments being dependent on the second time of reception.

16. A receiver device as claimed in claim 1, wherein the detector is further configured to receive a second signal during a second reception phase, and to be triggered when a feature of the second signal is received so as to determine a time of reception of that feature; and wherein the receiver device further comprises:
a second coherent receiver configured to process the second signal in time-limited segments so as to derive information from features of the second signal received during those segments, the second coherent receiver being configured to be dependent on the detector such that after the second reception phase the timings of the time-limited segments processed by the second receiver are dependent on the time of reception of the feature of the second signal determined by the detector; and
a third antenna configured to provide the second signal to the second receiver.

17. A receiver device as claimed in claim 1, wherein the features are pulses.

18. A receiver device as claimed in claim 1, wherein the coherent receiver is inactive during the first reception phase.

19. A receiver device as claimed in claim 1, the receiver device being a part of a location system for estimating the location of a transmitter of the signal by means of the receiver.

20. A receiver device as claimed in claim 1, comprising a signal processor coupled to the coherent receiver for receiving the output thereof so as to determine the time of reception of features received by the coherent receiver.

21. A transmitter for transmitting signals by means of which the transmitter can be located, the transmitter being configured to repeatedly transmit blocks of the following format:
a first portion comprising a series of pulses, each pulse being located in a respective time slot and each time slot being offset from the next by a first time; and
a second portion comprising a series of pulses, each pulse being located in a respective time slot and each time slot being offset from the next by a second time, wherein the first time is not an integer multiple of the second time;
the transmitter having an identity and the pulses of the first portion being arranged so as to convey the identity of the transmitter.

22. A transmitter as claimed in claim 21, wherein the pulses of the first portion convey the identity of the transmitter by virtue of the omission of pulses from one or more of the time slots.

23. A transmitter as claimed in claim 21, wherein the amplitude of the pulses of the first portion is greater than that of the pulses of the second portion.

24. A transmitter as claimed in claim 21, wherein the first pulse of the second portion is offset from the last time-slot of the first portion by a period that is not an integer multiple of the first time.

25. A transmitter as claimed in claim 21, wherein the first pulse of the second portion is offset from the last time-slot of the first portion by a period that is not an integer multiple of the second time.

26. A transmitter as claimed in claim 21, wherein the length of each time-slot of the first portion is equal to the length of each of the pulses comprised in the first portion.

27. A transmitter as claimed in claim 21, wherein the length of each time-slot of the second portion is equal to the length of each of the pulses comprised in the second portion.

28. A receiver device for receiving a signal that comprises one or more periodic features, the receiver device comprising:
a detector configured to listen to the signal during a first reception phase, and to be triggered when a feature of the signal is received so as to determine a time of reception of that feature;
a receiver configured to process the signal in time-limited segments so as to derive information from features of the signal received during those segments, the receiver being configured to be dependent on the detector such that after the first reception phase the timings of the time-limited segments processed by the receiver are dependent on the time of reception determined by the detector; and
a switch configured to direct the signal to either the detector or the receiver, and wherein the switch is configured to direct the signal to the detector during the first reception phase and to the receiver after the first reception phase.

* * * * *